(No Model.) 5 Sheets—Sheet 1.

F. GRANT & A. H. MURRAY.
MACHINE FOR RE-PRESSING BRICKS.

No. 485,191. Patented Nov. 1, 1892.

Witnesses
C. C. Burdine
H. E. Peck

Inventors
Frank Grant
& Alexander H. Murray.

(No Model.) 5 Sheets—Sheet 3.

F. GRANT & A. H. MURRAY.
MACHINE FOR RE-PRESSING BRICKS.

No. 485,191. Patented Nov. 1, 1892.

Witnesses
C. C. Burdine
H. E. Peck

Inventors
Frank Grant
& Alexander H. Murray
per O. E. Duffmatty.

THE NORRIS PETERS CO., PHOTO-LITHO., WASHINGTON, D. C.

(No Model.) 5 Sheets—Sheet 4.

F. GRANT & A. H. MURRAY.
MACHINE FOR RE-PRESSING BRICKS.

No. 485,191. Patented Nov. 1, 1892.

Witnesses
C. C. Burdine
H. E. Peak

Inventors
Frank Grant
& Alexander H. Murray.
per O. E. Duffy
atty (No Model.) 5 Sheets—Sheet 5.
F. GRANT & A. H. MURRAY.
MACHINE FOR RE-PRESSING BRICKS.
No. 485,191. Patented Nov. 1, 1892.
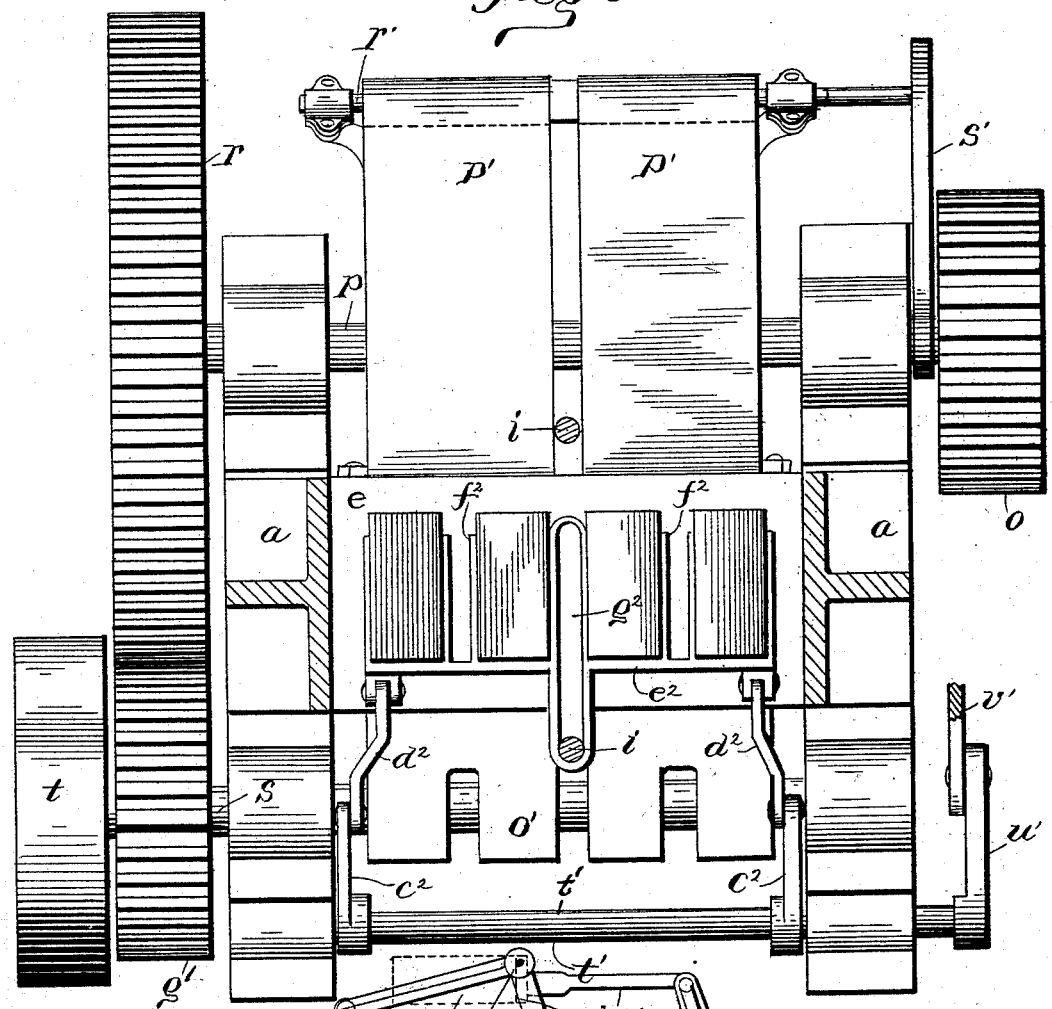
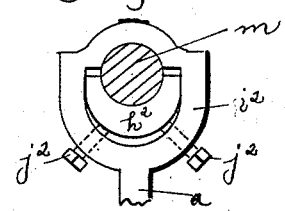
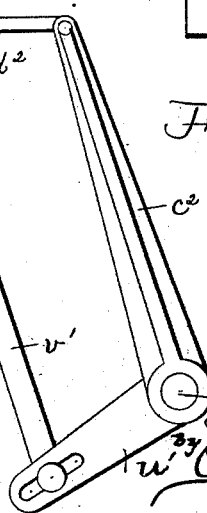
WITNESSES:
C. C. Burdine
H. E. Peck
INVENTORS
Frank Grant
Alex. H. Murray
by O. E. Duff
ATTORNEY

UNITED STATES PATENT OFFICE.

FRANK GRANT AND ALEXANDER H. MURRAY, OF MIDDLEPORT, OHIO, ASSIGNORS OF ONE-HALF TO J. S. BOGGESS, AGENT OF THE OHIO MACHINE COMPANY, OF SAME PLACE.

MACHINE FOR RE-PRESSING BRICKS.

SPECIFICATION forming part of Letters Patent No. 485,191, dated November 1, 1892.

Application filed July 7, 1891. Serial No. 398,639. (No model.)

*To all whom it may concern:*

Be it known that we, FRANK GRANT and ALEXANDER H. MURRAY, of Middleport, in the county of Meigs and State of Ohio, have invented certain new and useful Improvements in Machines for Re-Pressing Bricks; and we do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in brick-machines, and more particularly to improvements in machines for re-pressing brick.

The object of our invention is to provide an improved power machine for re-pressing bricks, simple, cheap, and durable in construction, and which will be exceedingly sure and effective in action, and which will most efficiently perform its operation.

A further object of the invention is to provide certain improved constructions and arrangements of details and parts whereby a machine of high efficiency is provided.

These objects are accomplished by and our invention consists in certain novel features of construction and in combinations of parts more fully described hereinafter, and particularly pointed out in the claims.

Figure 1:
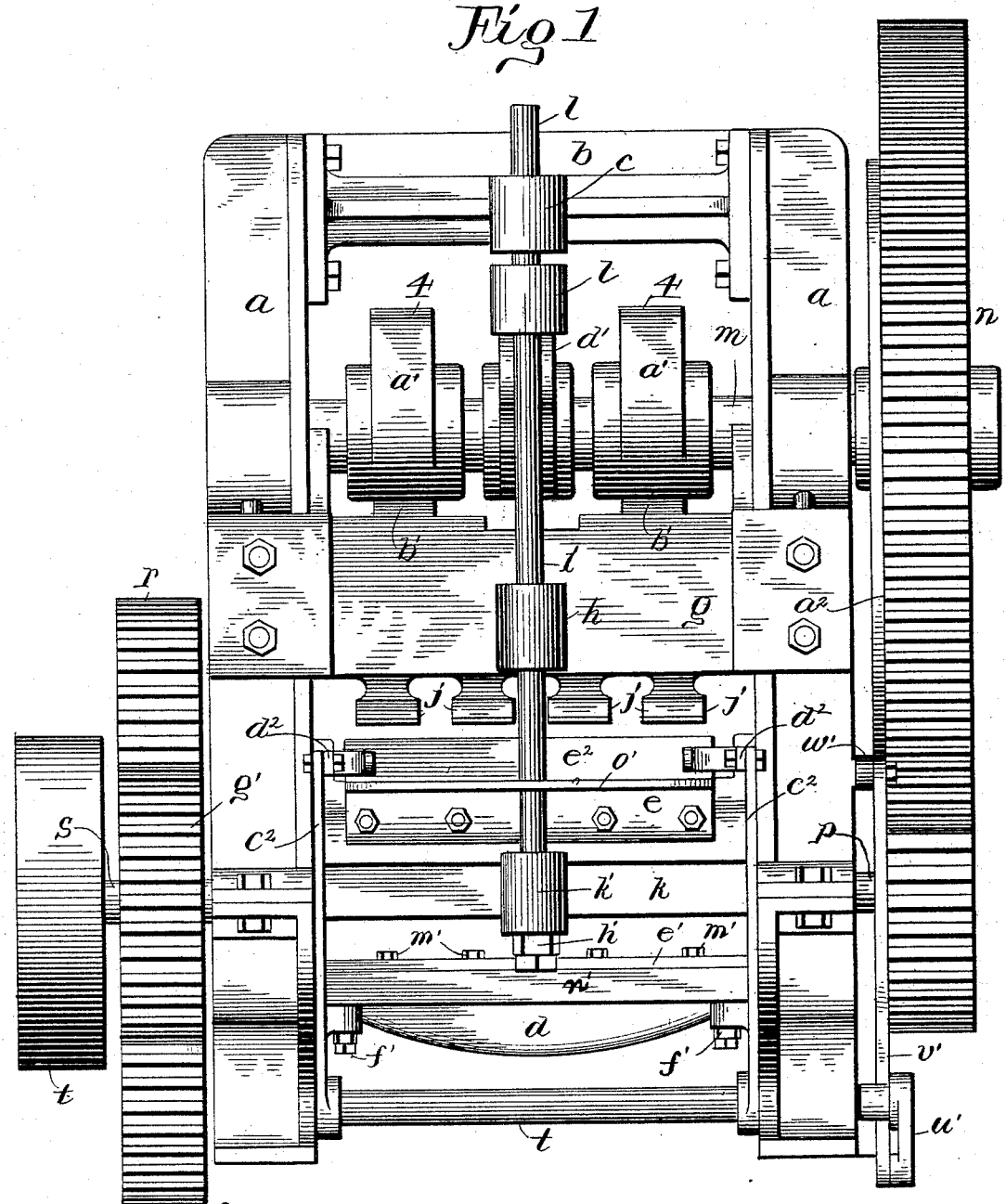
Figure 2:
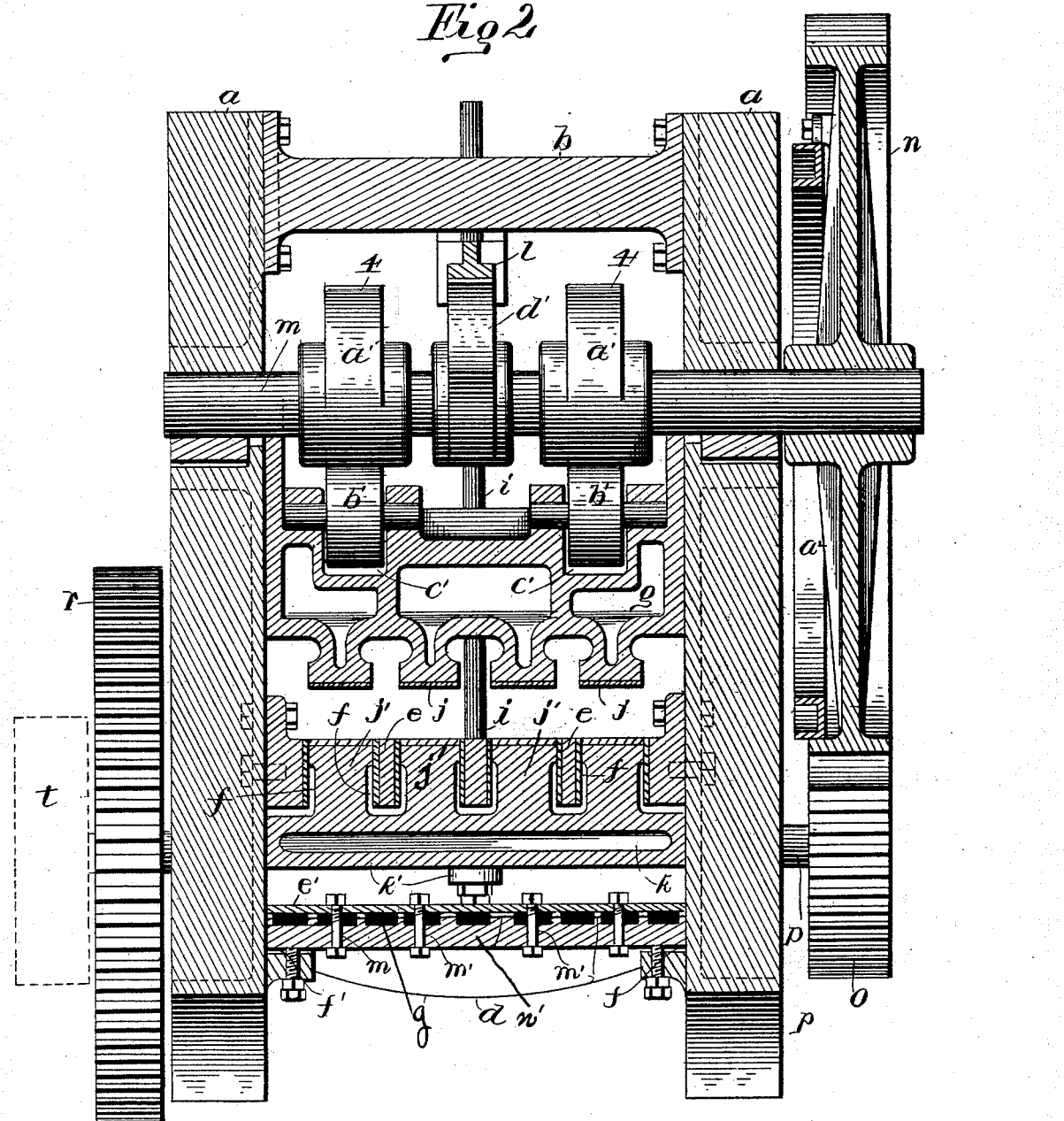
Figure 3:
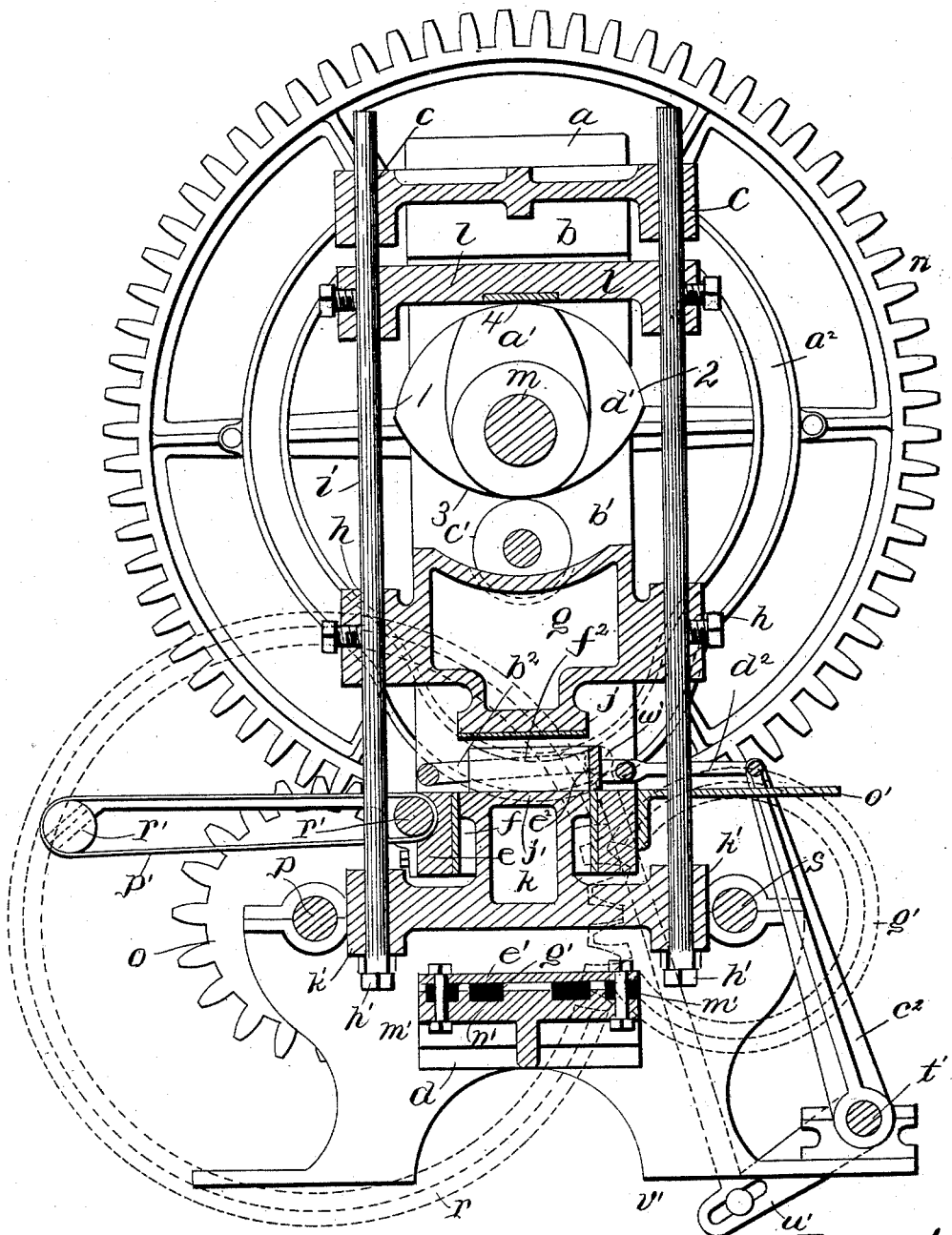
Figure 4:
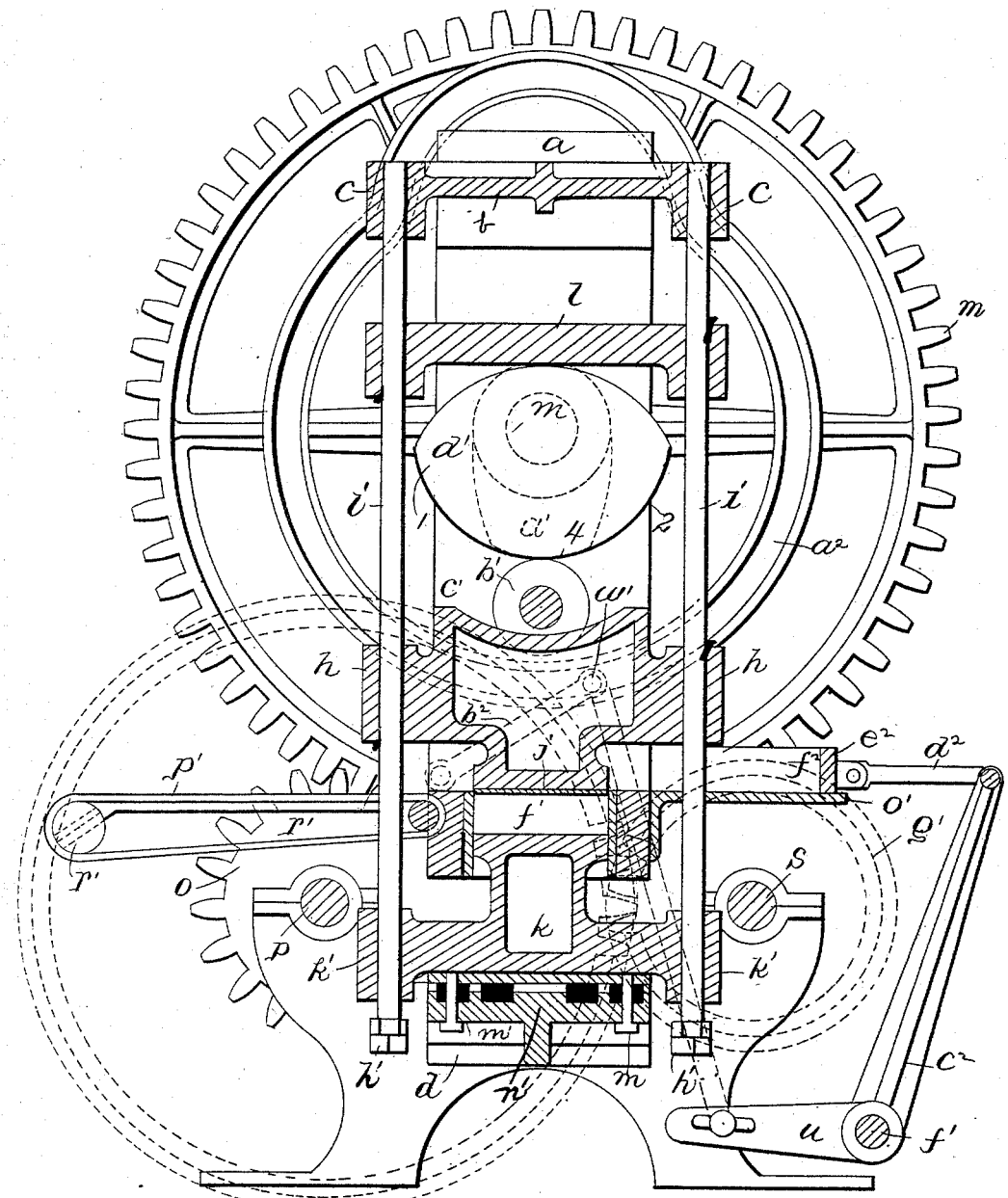

Referring to the accompanying drawings, Figure 1 is a side elevation of the machine. Fig. 2 is a vertical section of the machine. Fig. 3 is a vertical cross-section, the parts being shown in the position they assume when bricks are being discharged from the molds. Fig. 4 is a view similar to Fig. 3, showing the parts in the position they assume when in the act of pressing brick. Fig. 5 is a horizontal cross-section of the machine, taken just above the molds. Figs. 6 and 7 are detail views.

In the drawings reference-letters $a\ a$ indicate the two vertical sides of the main frame forming guides, being, preferably, T-shaped in cross-section, as shown. The upper ends of these guides are connected by the rigid cross-piece $b$ on opposite sides of its center, provided with the vertical guide tubes or sockets $c$. The lower ends of these sides or guides of the frame are rigidly connected by the cross-bar $d$.

$e$ indicates the horizontal mold-frame, extending horizontally between the two sides $a$ and at its ends rigidly secured thereto or formed integral therewith. This mold-frame has a series of vertical openings or molds $f$, open at the top and bottom, as shown, and each mold is of the same length and breadth as the bricks to be operated upon and is open at the top and bottom. The present mold-frame is shown provided with four molds; but of course this number may be increased or diminished at will.

$g$ indicates the reciprocating presser, at its ends formed to fit the guides $a\ a$, so as to permit reciprocation and to be held in place thereby. This presser is provided with projecting sockets $h$ at the center of its sides, through which the vertical rods $i$ pass and in which said rods are rigidly secured. These rods work loosely through guiding-sockets $c$ of the upper cross-bar of the frame. The under side of the presser is formed with a series of downwardly-projecting dies $j$, equal in number to the molds $f$, and each die is of a size to snugly fit its respective mold, each die being located over its mold, as shown, and formed integral with the presser and preferably of such length as to move a suitable distance into the mold, and preferably provided with a face-plate on its lower end, which can be formed to make bricks of a flat plane surface or ornamented. This presser is preferably cast integral with its dies and is preferably, although not necessarily, formed hollow, as shown, to economize metal and reduce weight and to permit of the dies being heated by steam.

$k$ indicates the lower presser and ejector, formed somewhat similar to the upper presser and located below the mold-frame and at its ends formed to fit and reciprocate between the sides $a$, and having the upwardly-extending dies $j'$ to enter the mold-frame beneath and form the follower thereof, and having central lateral sockets or tubes $k'$, through which the rods $i$ loosely pass and which during portions of the operation rest on the nuts $h'$ on the lower ends of the rods $i$, said presser being lifted by said ends. The dies $j'$ of the follower or lower presser are of such length that they can extend completely through the molds, so that their upper faces will be flush with or extend above the upper face of the mold-frame.

$l$ indicates the lifting-bar, extending between and at its ends secured to the two rods $i$ above the main shaft $m$ of the machine. This shaft $m$ extends horizontally through the machine and is journaled in suitable bearings in the sides thereof, the said shaft being located between the presser $g$ and the lifting cross-bar $l$. This shaft is driven by gear-wheel $n$, on one end thereof meshing with the pinion $o$ on one end of counter-shaft $p$, the opposite end of said counter-shaft having the gear-wheel $r$, driven by the pinion $g'$, rigid on the drive-shaft $s$, which drive-shaft has a driving-pulley $t$ rigid thereon. The upper presser is forced down by the two cams $a'$, rigid on the shaft $m$, with their peripheries engaging the rollers $b'$, mounted in suitable bearings formed in the side walls of recesses $c'$ in upper side of the presser. The follower or presser and the upper presser are both lifted by the elliptically-shaped cam $d'$, engaging the lifting-bar $l$, rigid with the rods $i$. During the pressing operation the follower rests on an elastic bed composed of a bed-plate $n'$, supported by the cross-bar $d$ and resting on bolts $f'$, whereby the bed can be adjusted vertically. The upper face of the bed-plate is formed with a series of shallow sockets, in which disks $g'$, formed of rubber or other suitable elastic material, are seated so as to project a considerable distance above the face of the bed $n'$. The plate $e'$ rests on these rubber disks and is secured in position by the bolts $m'$, passing through the bed and said stop-plate $e'$, thereby forming an elastic bed or stop for the follower. The upper face of the mold-frame is preferably formed flat and is provided with a horizontal work-table $o'$, extending forwardly from its front edge. The conveyer-belts $p'$ form a rearward extension of said mold-frame to convey the bricks out at the rear side of the machine. Said conveyer works on rollers $r'$, driven by the belt $s'$ from the counter-shaft $p$, the conveyer being divided to admit the passage of one of the rods $i$.

A suitable device is provided to carry the bricks from the work-table into the molds and then after the bricks have been pressed to carry the same rearwardly upon the conveyer $p'$. This device preferably consists of the rock-shaft $t'$, suitably mounted in the lower part of the machine and having a rigid downwardly-extending crank-arm $u'$, to the outer end of which a link $v'$ is loosely joined at its lower end, while the upper end of said link extends upwardly and is provided with a roller $w'$, working in the continuous cam-groove $a^2$, rigid with the large gear-wheel $n$ of the cam-shaft, the upper end of the link $v'$ being pivoted to the outer free end of the swinging link $b^2$. One or more rigid crank-arms $c^2$ extend upwardly from the shaft $t'$ through slots in the outer edge of the work-table or extend up on each side of the work-table, and the upper ends of these arms $c^2$ above the work-table are pivotally connected by short links $d^2$ above the table to the outer side of the pusher $e^2$, sliding back and forth over the upper faces of the mold-frame and work-table, this pusher consisting of the horizontal wall or plate extending transversely of the table and mold-frame and provided with forwardly-extending partitions or parallel walls $f^2$. The partitions $f^2$ form spaces extending to molds and of dimensions to snugly receive the bricks, the partitions being so located that they form spaces registering with the molds. These spaces are open at their front ends, as shown. This pusher or brick-mover is provided with the elongated yoke $g^2$ to receive the lifting-rod $i$ of the pressers. Where the cam-shaft passes through the side pieces $a a$ of the frame, said side pieces are enlarged at $i^2$ to receive bearing or journal blocks $h^2$. Screws $j^2$ pass upwardly through the enlarged portion of the side pieces and bar against the journal-block to bear the same upwardly, and thereby compensate for wear.

When the machine is in position to receive the brick, the brick pusher or mover is located on the work-table $o'$, and the two pressers are raised their full stroke and the operating portions of the two cams $a'$ are disengaged from the rollers $b'$, and the lifting-bar $l$ is engaged by one of the flat sides of the double elliptical cam $d'$. The soft-molded bricks are then dropped in the four spaces of the brick mover or pusher, and as the machine continues to operate the cam-grooves $a^2$ force down the link $v'$ and crank-arm $u'$, and thereby rock the rock-shaft in a direction to throw the crank-arm $c^2$ toward the machine, thereby sliding the brick-pusher and the bricks onto the upper ends of the dies of the lower presser, forming the floors of the molds. The pressers then begin to drop after receiving the impressed bricks. The cam-grooves $a^2$ are so arranged that the brick pusher or mover then slides out upon the work-table $o'$ from beneath the presser. The cam-shaft then revolves so that the raising-surface 1 2 of the cam $d'$, disengaging the lifting-bar and the surface 3 of less eccentricity, allows the lifting-bar and the rods $i$ and the presser to descend, so that the lower presser or follower gradually drops to its normal position, resting on the elastic stop-plate $e'$. The cams $a'$ gradually force down the presser by engaging the rollers $b^2$ until the outermost surface 4 of the cams engages the rollers. This surface 4 holds the presser at its limit of downward stroke while said surface is in engagement with the rollers, thereby continuing the pressure upon the bricks in the molds and presenting the bricks the desired amount between the dies of the presser and the follower or lower presser, the dies of the presser preferably entering the molds but a short distance, as shown in Fig. 4. As the pressure on the follower increases, the elastic disks upon which the follower stop-plate rests gradually become compressed, so that should the pressure become materially increased no part of the machine would be broken. This is very often the case where a surplus quantity of clay is included in one brick. Furthermore, this elastic stop-plate assists in holding the presser against the bricks in the mold.

As before mentioned, the stop-plate $e'$ by means of the bolts $m'$ and $f'$ can be adjusted vertically and to bear with greater or less tension on the elastic disks or supports thereof. As the extended working surface 4 of the cams $a'$ passes through and out of engagement with the rollers $b'$ the pressing operation is completed and the lifting-cam $d'$ begins to lift the lifting-bar, and thereby raises the presser and follower, the follower lifting the pressed bricks out of the molds into the position shown in Fig. 2 flush with the upper surface of the mold-board. The brick-mover then moves rearwardly and the bricks therein engage the front ends of the pressed bricks and push them rearwardly onto the belt $p'$, which carries off the pressed bricks and moves the unpressed bricks onto the dies of lower presser. It will thus be seen that a machine automatic in action is provided which will apply almost any suitable pressure to the bricks and will then automatically discharge the same, the operation being quickly done in the most efficient manner.

It is unnecessary to herein fully elucidate the great utility and most obvious advantages of this machine.

It is evident that various changes might be made in the form, construction, and arrangements of the parts described without departing from the spirit and scope of our invention. Hence we do not limit ourselves to the construction herein set forth; but

What we claim is—

1. In a brick-re-pressing machine, the frame having the vertical sides, the mold-frame secured between said sides, having the molds, the lower presser sliding between said sides, having the dies to enter said molds, the upper presser above the mold-frame, sliding between said sides and having the dies to enter the upper ends of the molds, the upper presser having recesses in its upper face, in the slots of which vertical rollers are mounted, the cam-shaft having cams to engage said rollers and depress the presser, and rods secured to said upper presser and arranged to lift the lower presser, a cross-bar connecting said rods, and a lifting-cam on the cam-shaft, arranged to engage said cross-bar and lift the two pressers.

2. In a brick-re-pressing machine, the vertical sides of the frame, the mold-frame, the lower reciprocating presser and the upper reciprocating presser, a cam-shaft having cams to force down the upper presser, rods extending down and rigidly secured to the upper presser to lift the same and loosely joined to the lower presser to lift the same and move down independently thereof, and a cam on said shaft to lift said rods and thereby raise the two pressers.

3. The combination of the two parallel uprights, upper and lower rigid cross-bars connecting the same, the upper cross-bar having lateral sockets or guides, the mold-frame rigid with the uprights and between said cross-bars, the reciprocating pressers on opposite sides of the mold-frame, having their ends formed to slide on said uprights, said pressers having lateral sockets, the two lifting-bars passing loosely through the sockets of said upper cross-bar and the lower presser and rigid in the upper presser-sockets and arranged to lift the pressers, a lifting cross-bar connecting said bars above the upper presser, and a shaft mounted in the uprights between said upper presser and lifting cross-bar and having cams to lift the pressers and to force down the upper presser.

4. In a brick-machine, the combination of the frame comprising uprights, a mold-frame, upper and lower reciprocating pressers, a single shaft mounted in the upper portion of the uprights and constructed and provided with means to force down the upper presser, and a lifting-frame arranged to lift both pressers, said frame being loosely connected with one of the pressers to move independently thereof in one direction, substantially as described.

5. In combination, the uprights, the mold-frame, the upper and lower reciprocating pressers, the horizontal rotary cam-shaft, cams on said shaft, arranged to engage and force down the upper presser, the lifting-frame arranged to lift both of the pressers, as described, and the double elliptical cam on the shaft, arranged to engage and lift said frame, as set forth.

6. In combination, the two parallel uprights, the cross-bars rigidly securing their opposite ends together, the mold-frame at its ends rigidly secured to the uprights between their ends, the upper and lower pressers, respectively, between the mold-frame and cross-bars and formed at their ends to slide on the uprights, the horizontal shaft at its ends mounted in the uprights and extending between the same and between the upper presser and upper cross-bar, cams on said shaft to engage and force down the upper presser, and the lifting-frame arranged to lift both pressers and extending up from said shaft and operated by a cam thereof, said lifting-frame extending down beside and through sockets of the pressers and arranged to operate as set forth.

7. In a brick-pressing machine, the combination of the uprights, a mold-frame, upper and lower pressers and operating mechanism, a rigid cross-bar between said uprights beneath the lower presser, vertical bolts passing up through said cross-bar, the bed resting loosely on and vertically adjustable by said bolts, the cushions—such as elastic disks—on said bed, the plate on said cushions, and the bolts passing through the bed and said plate and loosely confining said plate in place, as described.

In testimony that we claim the foregoing as our own we affix our signatures in presence of two witnesses.

FRANK GRANT.
ALEXANDER H. MURRAY.

Witnesses as to Frank Grant's signature:
O. E. DUFFY,
C. M. WERLÉ,

Witnesses as to A. H. Murray's signature:
JOHN PETERS,
D. C. MCCRACKEN.